United States Patent [19]

Appel

[11] 4,023,667
[45] May 17, 1977

[54] APPARATUS FOR UNSTACKING FLAT STEEL MATERIAL WHICH IS TRANSPORTED STACKED ON A RAKE COOLING BED

[75] Inventor: Manfred Appel, Duisburg, Germany

[73] Assignee: Demag Aktiengesellschaft, Germany

[22] Filed: Oct. 29, 1975

[21] Appl. No.: 626,861

[30] Foreign Application Priority Data

Nov. 30, 1974 Germany ............................ 2456796

[52] U.S. Cl. ............................... 198/474; 214/85 R
[51] Int. Cl.² ........................................ B65G 59/00
[58] Field of Search ............... 198/29, 34, 35, 218, 198/219, 443, 474, 485, 499, 490, 774; 214/8.5 R, 8.5 A

[56] References Cited

UNITED STATES PATENTS

| | | | |
|---|---|---|---|
| 1,931,405 | 10/1933 | Dahlstrom | 198/35 |
| 3,130,830 | 4/1964 | Allbeson | 198/219 |
| 3,575,279 | 4/1971 | Buchheit | 198/35 |

FOREIGN PATENTS OR APPLICATIONS

| | | | |
|---|---|---|---|
| 76,199 | 9/1970 | Germany | 198/218 |

*Primary Examiner*—Johnny D. Cherry
*Assistant Examiner*—Joseph E. Valenza
*Attorney, Agent, or Firm*—Mandeville and Schweitzer

[57] ABSTRACT

The invention covers apparatus for unstacking bar-shaped flat steel material which is transported stacked on a rake cooling bed having stationary and mobile rakes, in which the broad flat sides of the material rest on the rake flanks which are declining or sloped downward with respect to the direction of movement, and in which the side edges of the material rest on the inclined rake flanks which are rising or sloped upward with respect to the direction of movement.

1 Claim, 1 Drawing Figure

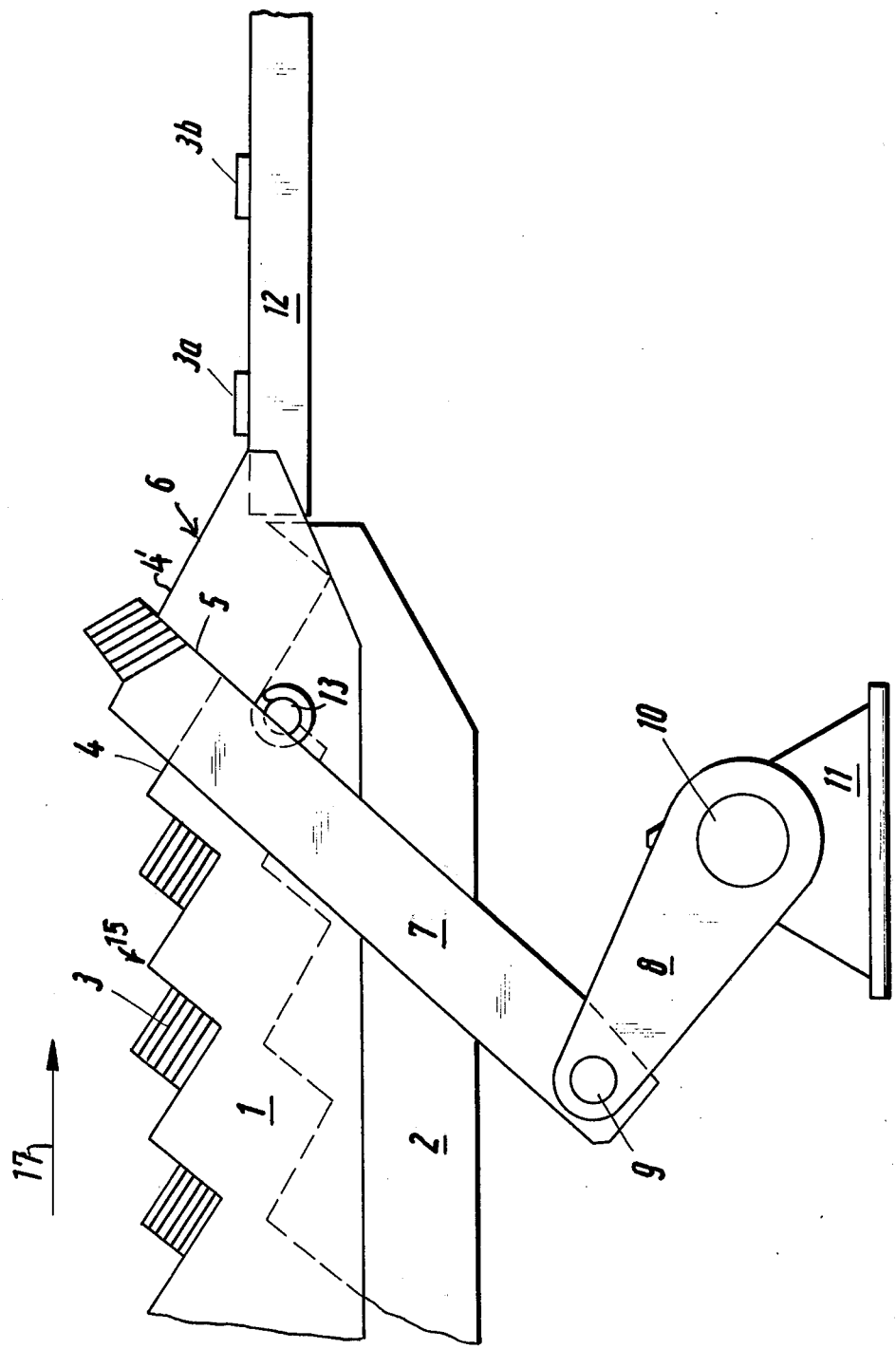

APPARATUS FOR UNSTACKING FLAT STEEL MATERIAL WHICH IS TRANSPORTED STACKED ON A RAKE COOLING BED

BACKGROUND OF THE INVENTION

Certain special kinds of formed steel bars are transported stacked in unit groups on rake cooling beds in metallurgical applications. At the end of the cooling bed, the unit groups must be separated before further processing.

It is known to separate the unit groups stacked on the last cog of the rake cooling bed by electro-mechanically removing the lowest flat material bar. This method is rather involved and may easily damage the material to be transported. Furthermore, it is impossible the ensure that only the lowest bar is actually removed. Very often two or more bars are removed at the same time.

Based on this consideration, it is the object of the present invention to create an apparatus of the above mentioned type which permits a safe one-by-one separation of the stacked flat material units groups in a simple and safe manner.

SUMMARY OF THE PRESENT INVENTION

In accordance with the present invention, an unstacking apparatus is provided which is equipped with several sliders distributed over the cooling bed width between the last stationary rake cogs. These sliders form bearing surfaces approximately parallel with the rake flanks for the thin side edges of the bar material, whereby the sliders may be moved from a rest position beneath the stationary rake cogs in a path approximately parallel to the rising flanks of the rake cogs at essentially a uniform velocity into a terminal position above the stationary rake cogs. The slider movement is such that the successive bearing surfaces of each uppermost flat material bar align with and slide along the last declining cog flanks of the stationary rakes. This arrangement causes the unstacking by simply progressively pushing the unit group up, over, and off the last rake cog, whereby the uppermost flat material bar of the unit group slides off by virtue of its own weight and gravity, onto a conveyor. Thus, very uncomplicated devices are employed, which exert the least stress on the material being unstacked.

Preferably, provision is made so that each slider pivots around a horizontal axis transverse to the direction of movement, at the end of a hinged lever positioned beneath the cooling bed, and that each slider rests against a stationary roll positioned on the rake. Accordingly, simple but strong machine elements, not susceptible to damage, are employed to form the new apparatus. This is a very important consideration in the rough environment of a rolling mill operation.

In accordance with another aspect of the invention, all hinged slider levers may have one common drive shaft. As a further specific aspect of the invention, in order to vary the speed of the separating process and therefore to vary the spacing between the individual bars sliding off the rake, the speed of the slider may be selectively adjustable.

For a more complete understanding of the present invention and for a better appreciation of its attendant advantages, reference should be made to the accompanying drawing in conjunction with the following detailed description of the invention.

DESCRIPTION OF THE DRAWING

The single drawing is a schematic side elevational view of a new and improved unstacking apparatus embodying the principles of the invention.

DETAILED DESCRIPTION OF THE INVENTION

Referring now the drawing, the unstacking apparatus includes stationary element 1 and moving rake element 2. Unit groups of flat material 3, e.g. steel bars, are stacked on the individual rake cogs 15 formed by declining flanks 4 and rising flanks 5. The last declining flank 4' of the stationary rake meshes with a bar removal conveyor 12. The separated flat material bars, such as 3a and 3b, lie on bar removal conveyor 12. A drive mechanism for a separating slider 7 is located beneath the rake cooling bed and comprises a pedestal 11, an operating shaft 10 on which lever 8 pivots about the shaft axis; and a rotary drive for shaft 10, not shown. The opposite end of lever 8 is equipped with a joint 9 at which the slider 7 is hinged. As shown slider 7 is partially supported by means of a roll guide 13 located adjacent the stationary rake 1.

The unit groups of stacked flat material 3 are advanced along the cogs 15 of the rake 1 over the rake cooling bed in step by step fashion by means of the mobile rake 2 in the direction indicated by arrow 17. As soon as the unit group 3 arrives at the last rake cog 6, the sliding separation or unstacking process is commenced. Through the rotating shaft 10, the lever 8 moves upward and causes slider 7 supported on roll 13 to slide along flanks 5 of cog 6. This lifts the flat material of the unit group up and over to declining flank 4' of last rake cog 6 in a manner whereby the uppermost flat material bar is unstacked and slides off the unit group along the declining flank 4'. With slider 7 progressively advancing further, all of the flat material bars are pushed one-by-one over onto declining flank 4' and then onto the bar removal conveyor 12 in a predetermined spacing. As will be understood, size or length of the spacing will be a function of the speeds of the slider 7 and the conveyor 12.

While the apparatus herein disclosed forms preferred embodiments of this invention, this invention is not limited to those specific forms of apparatus, and changes can be made therein without departing from the scope of this invention which is defined in the appended claims.

I claim:

1. Apparatus for unstacking stacks of flat steel bars which have been moved over a rake cooling bed having stationary and movable rakes, said stacks being positioned with the flat sides of said bars parallel to the descending flanks of said rake cooling bed in the direction of movement thereof with the side edges of said bars on the ascending flanks, characterized by
    a. a plurality of sliders positioned between said stationary and movable rakes transverse of said direction of movement, adjacent the last cogs of said stationary rake;
    b. said sliders being mounted separately from said stationary and movable rakes;
    c. said sliders having bearing surfaces for said stacks substantially parallel to the descending flanks of said last cogs;
    d. movement means connected to each said slider;
    e. said movement means positioned to move said plurality of sliders from a first position below said stationary rake to a second position above said stationary rake and vice versa; and
f. said movement means positioned to move said plurality of sliders parallel to the ascending flanks of said last cogs;
g. whereby upward movement of said slider causes upward movement of said stacks on the ascending flanks of said last cogs and the spaced delivery of each bar of said stacks down the descending flanks of said last cogs; and h. said movement means comprises
1. a rotatable shaft positioned below and transverse to said stationary and moveable rakes;
2. a support for each said slider on said stationary rakes;
3. a hinged lever connected to each said slider;
4. the end of each said hinged lever opposite its respective slider fixed on said rotatable shaft; and
5. the speed of rotation of said shaft being adjustable.

* * * * *